July 8, 1941.   G. MEYER-JAGENBERG ET AL   2,248,535
PROCESS AND APPARATUS FOR MANUFACTURING PAPER CONTAINERS
Filed June 29, 1939   7 Sheets-Sheet 4

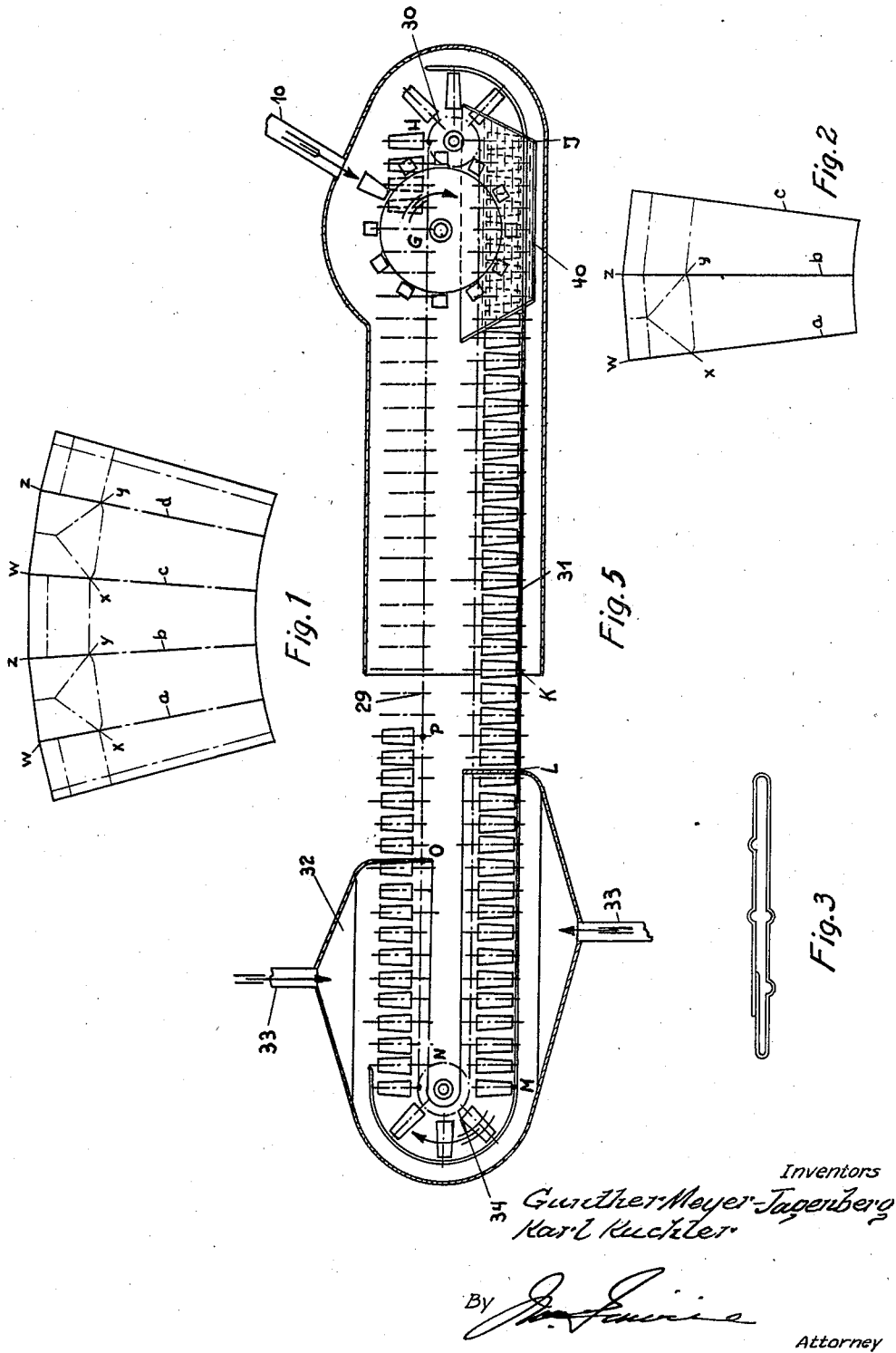

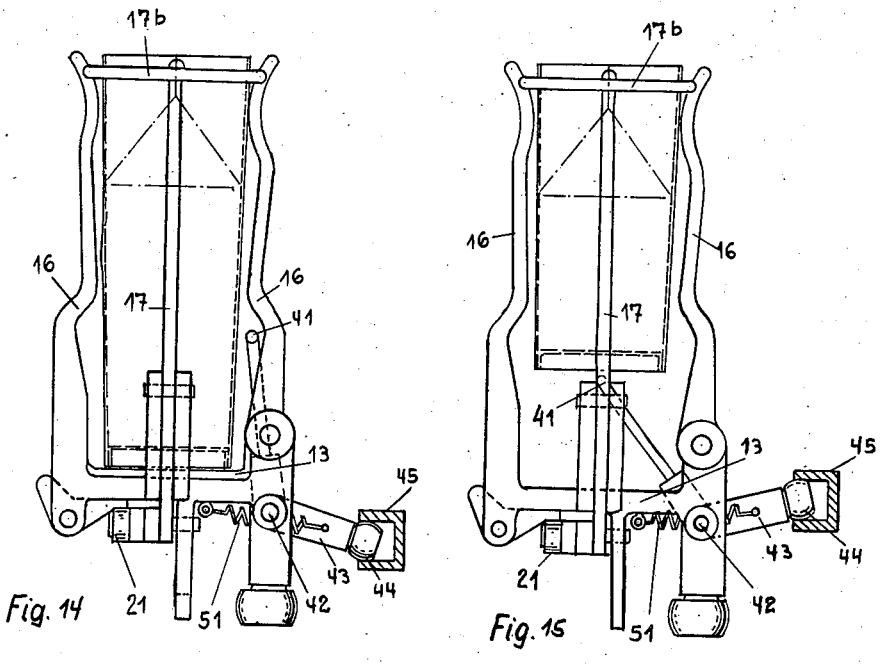
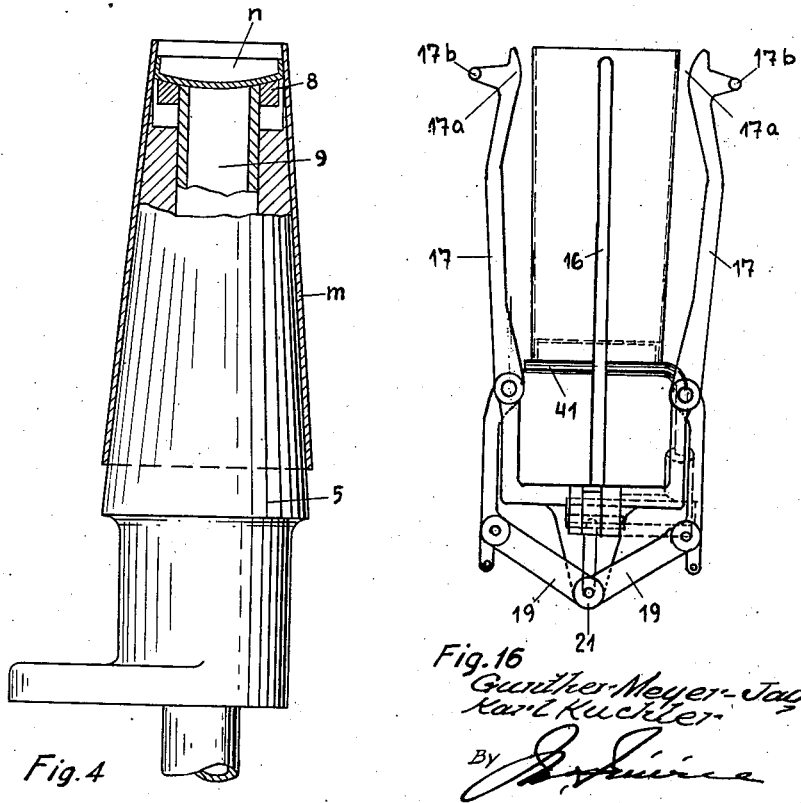

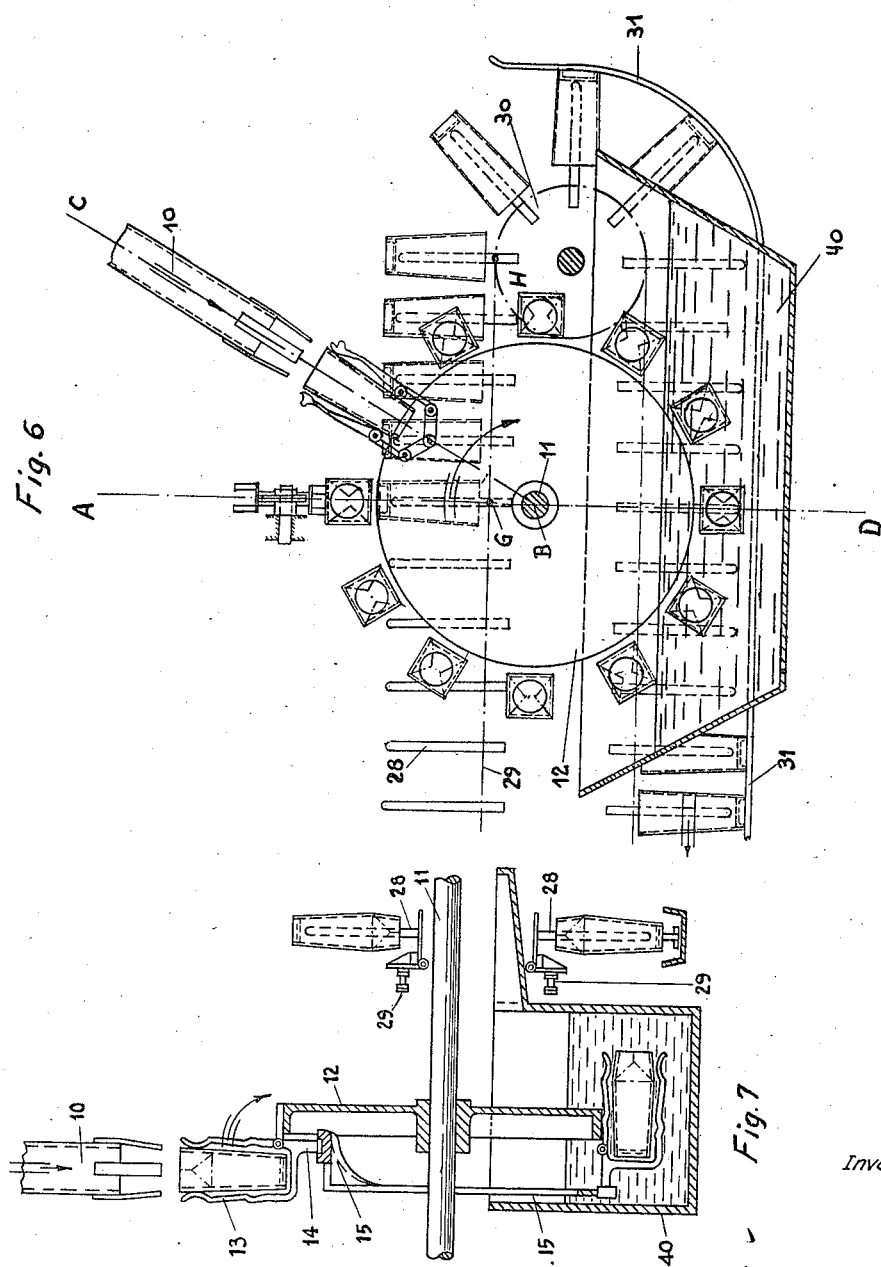

Inventor
Gunther Meyer-Jagenberg
Karl Kuchler

By [signature]

Attorney

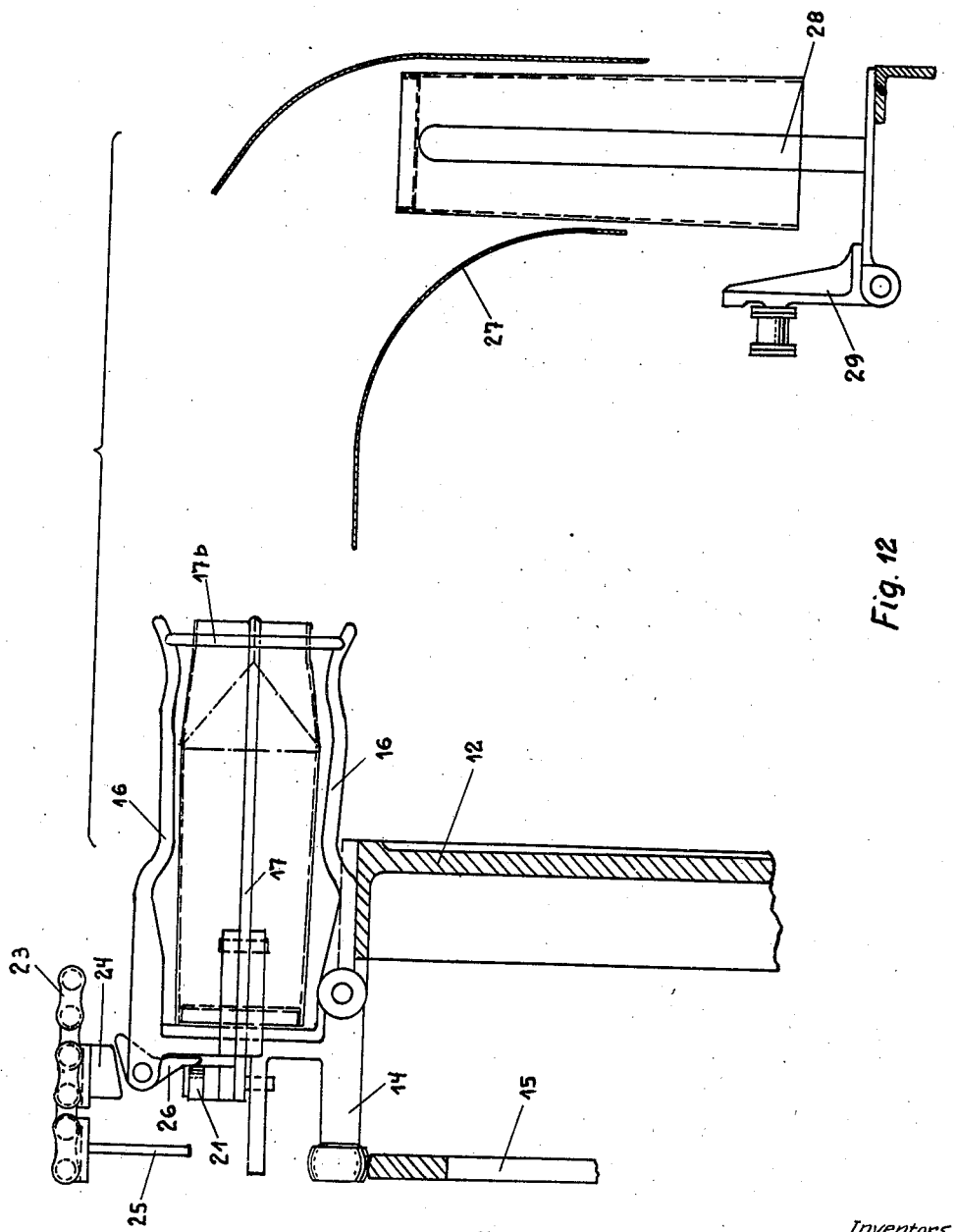

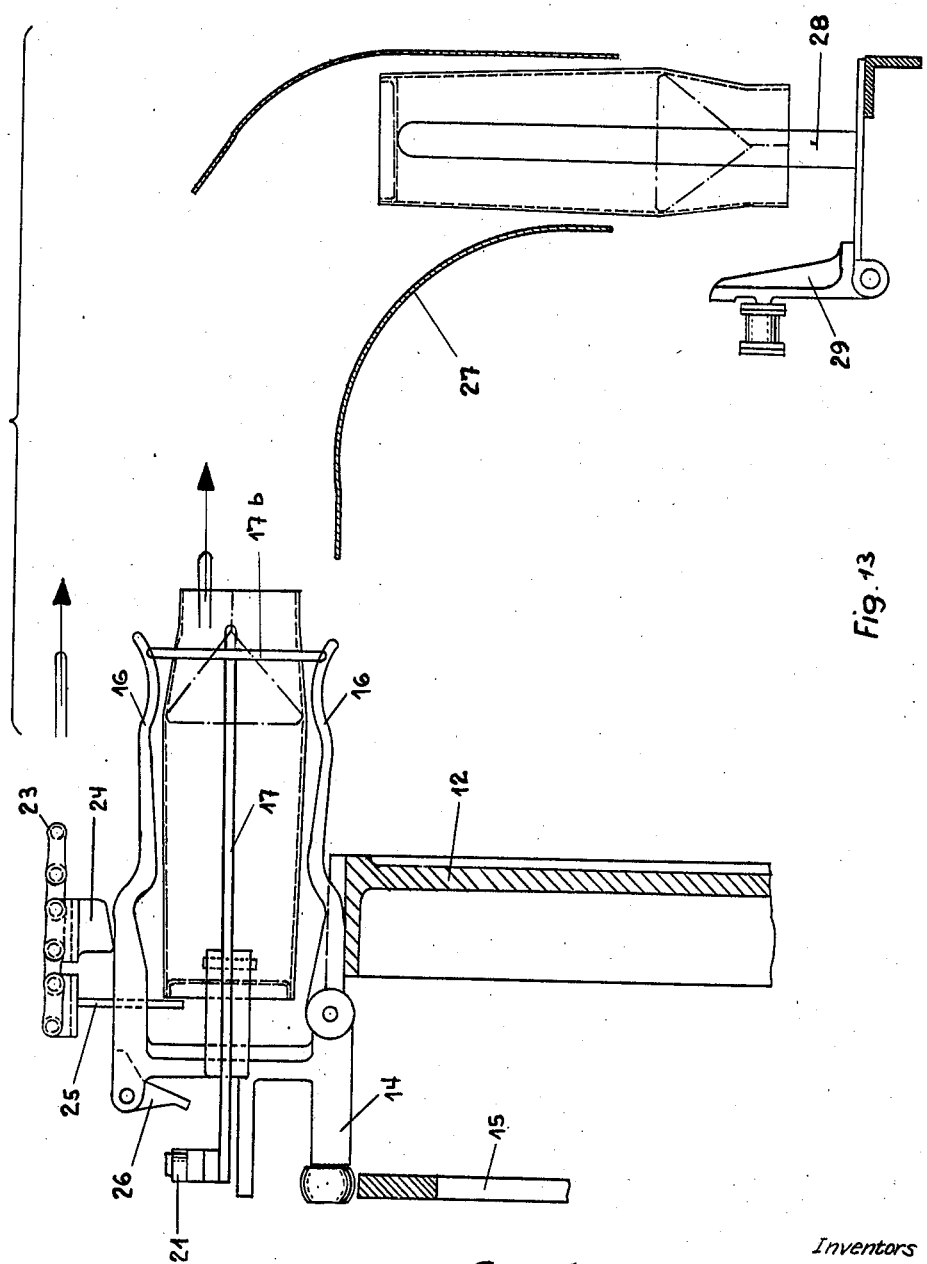

Patented July 8, 1941

2,248,535

UNITED STATES PATENT OFFICE 2,248,535

PROCESS AND APPARATUS FOR MANUFACTURING PAPER CONTAINERS

Günther Meyer-Jagenberg and Karl Küchler, Dusseldorf, Germany

Application June 29, 1939, Serial No. 282,000
In Germany July 1, 1938

9 Claims. (Cl. 93—36)

The invention relates to a method and apparatus for manufacturing paper containers provided with a folding closure and impregnated with paraffine or another substance stiffening the paper.

It is the object of the invention to provide for the manufacture of paper containers an improved method and apparatus by which the well-known stiffening effect of the impregnating means is used to secure the desired final shape of the container and to simultaneously bring the folding closure in such a condition that it can be folded together in a convenient manner and without any difficulty after the filling of the container.

It is another object of the invention to provide an improved method and apparatus which is especially adapted to produce paper containers having a multi-cornered cross section in the vicinity of the folding closure and a round cross section at their bottom.

A further object of the invention consists in an improved device in which the paper containers are guided during the impregnating process in such a manner that the desired shape is not disturbed nor deformed.

Further objects and advantages of the invention are described in the following together with an example of performance:

Fig. 1 illustrates a blank for a container body.

Fig. 2 illustrates a flat tube performed by folding and gluing of the blank illustrated in Fig. 1.

Fig. 3 is a plan view of this tube.

Fig. 4 demonstrates the inserting of the bottom part into the container body.

Fig. 5 illustrates—partly in section—a view of the complete device for paraffining.

Fig. 6 illustrates in a slightly enlarged scale a vertical section through the main part of the paraffining device.

Fig. 7 is a cross section through the paraffining device according to line CBD of Fig. 6.

Figure 8:
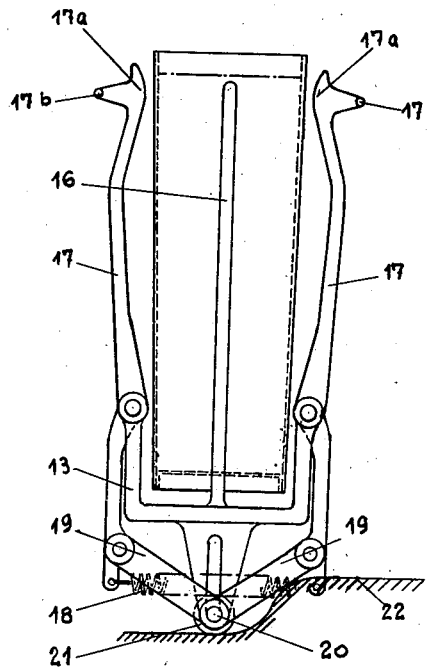
Figure 9:
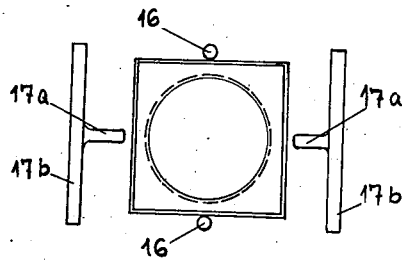

Figs. 8 and 9 respectively illustrate in an enlarged scale a view or a plan view respectively of one carrier with opened folding tools serving for passing the paper container through the liquid for impregnating.

Figure 10:
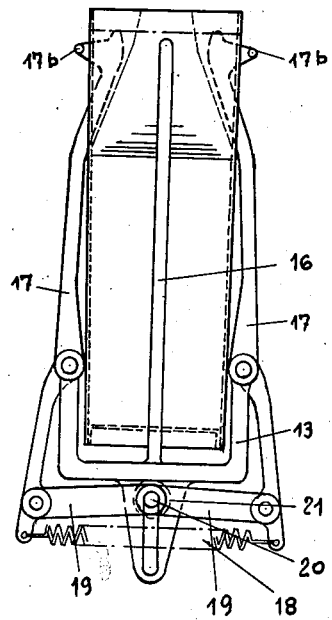
Figure 11:
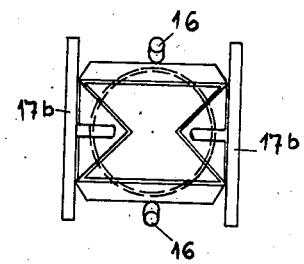

Figs. 10 and 11 illustrate each a corresponding view or plan view respectively with inwardly placed folding tools.

Figs. 12 and 13 illustrate—in an enlarged scale —each a section according to the line A—B of Fig. 6 in different positions of the tools serving for ejecting the paper containers from their carriers.

Figs. 14 and 15 illustrate each a view of a carrier serving for the reception of a paper container to be impregnated, which is provided with a stop limiting the possibility of entering the paper container, showing different positions of this stop.

Fig. 16 is a view of a carrier from another side.

Figure 17:
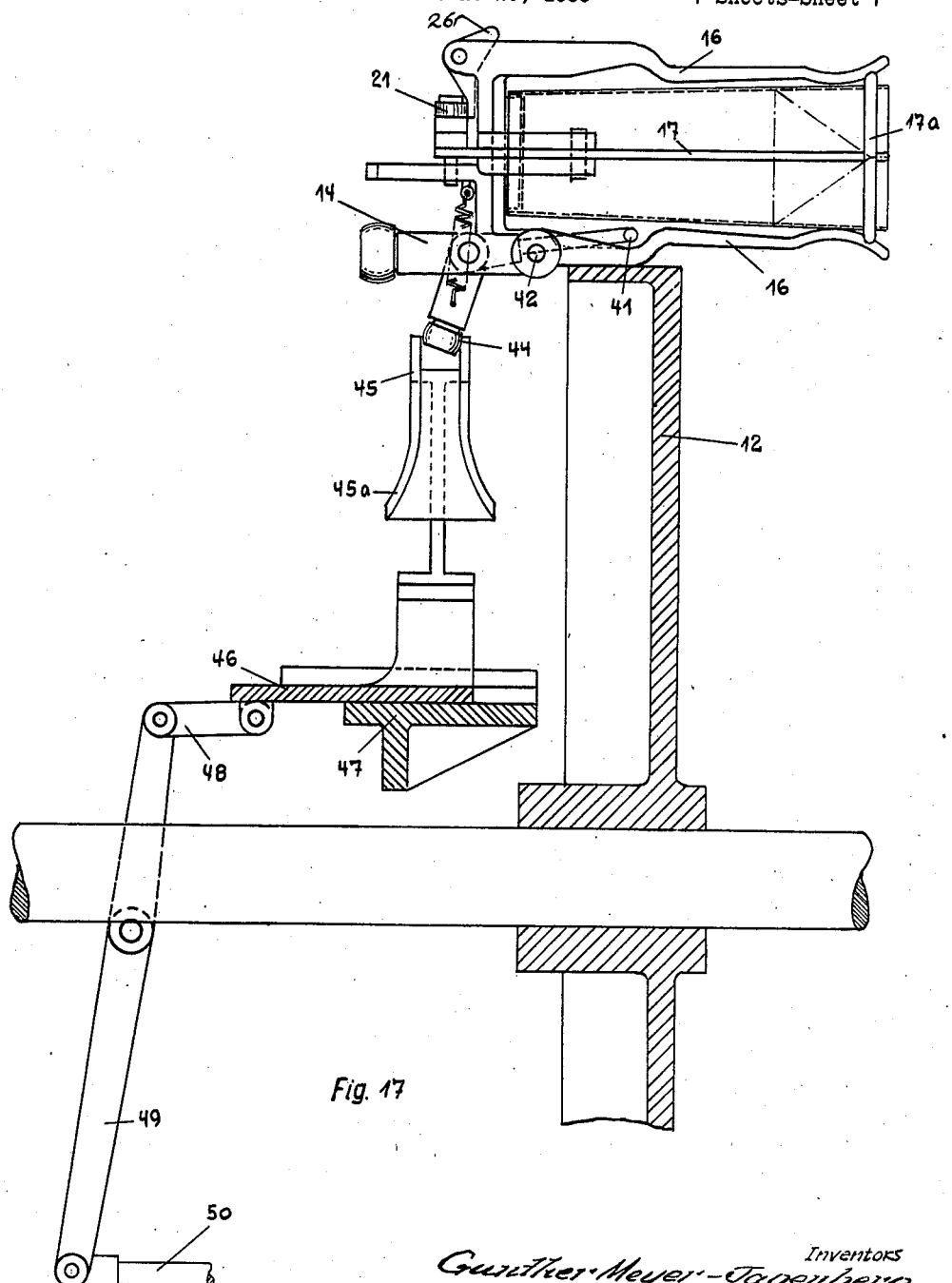

Fig. 17 illustrates the parts serving for operating the stop mentioned.

The performance of the method according to the invention and the employment of a device according to the invention are described in the following in connection with the manufacture of a paper container, which in the vicinity of the folding closure has a square cross section and below has a round cross section. For the manufacture of the paper container we start from the blank illustrated in Fig. 1. It is advantageous to prepare on this blank the lines or creases later on to be folded and, furthermore, to apply the creasing lines $a$, $b$, $c$, $d$ which correspond to the edges of the square container closure to be formed and essentially project over the whole length of the blank. An especially good preparation of this blank is furthermore obtained when the faces WXYZ later on to be folded are embossed so that they form deepened faces compared with the other parts of the blank. From the blank the flat tube illustrated in Figs. 2 and 3 is formed by folding and gluing, which then is opened and provided with a dish-like bottom part. For this purpose the opened tube $m$ is pushed on a block 5 which is provided at its upper end with a recess serving for the reception of the dish-like bottom $n$. From this recess the dish-shaped bottom part $n$ is pressed out by a plunger 8 and firmly pressed into the tapering body part $m$. After this, the rim of the container body $m$ projecting over the shoulder of the bottom part $n$ can be folded over and be stuck to the shoulder of the bottom part. In spite that the upper part of the container to be manufactured is to receive a square cross section the block 5 may be formed very simple; the block 5 can show on all points a circular cross section. After pressing in of the bottom part $n$ into the container body $m$ the container formed in this way is removed from the block 5 by a current of compressed air flowing through the bore 9 of plunger 8, by which the paper container can be conveyed through a corresponding conveying channel 10 directly into a carrier of the impregnating device illustrated in Fig. 5 and the following.

The main part of the impregnating device—see especially Figs. 5–7—consists of a disc 12 arranged on the rotating shaft 11, which on its circumference is provided with carriers 13 for the paper containers to be impregnated and immersed in a bath 40 for the impregnating liquid. The carriers 13 serving for the reception of the paper containers to be impregnated are arranged oscillatingly on the circumference of the disc 12. The position of these carriers 13 is operated during the rotation of the disc 12 by the mutual acting of a roll fitted to each arm 14 of every carrier and a fixed cam 15 in such a way, that the axis of the carrier on that point on which the feeding of the paper container from the conveying pipe 10 takes place is positioned radially to the shaft 11 and consequently on the same axis with the outlet of the feeding pipe 10, and during the further rotation, especially however during the passing of the paper container through the liquid for impregnating, is positioned horizontally. Each carrier 13 for a paper container to be impregnated is—as especially illustrated in Figs. 8–11—provided with two fixed arms 16. These arms may be developed slightly springy. On each carrier 13 furthermore two folding tools 17 are arranged oscillatingly. The two lower ends of these folding tools 17 are connected by means of a spring 18 and by two connecting pieces 19. The bolt 20 connecting the connecting pieces with each other carries a roll 21. The upper ends of the folding tools are developed as projecting folding rulers or folding noses 17a and carry furthermore besides these projecting folding noses 17a cross bars 17b lying behind. If a carrier 13 is below the outlet of the feeding pipe 10, the upper ends 17a of the folding tools 17 are opened. The position of the folding tools illustrated in Figs. 8 and 9 is secured by the spring 18, which pulls the lower ends of the folding tools 17 against each other. In the position mentioned the folding tools 17 do not hinder the insertion of a paper container into the carrier. If, owing to the rotation of the continually or intermittently moved disc 12, a carrier leaves the place opposite to the outlet of the feeding pipe 10 and advances further the roll 21 is pressed along an operating cam 22. This operating cam is built in such a way that the bell crank formed by the two connecting pieces 19 is pressed through into the position illustrated in Fig. 10, contrary to the power of the spring 18. By this also the upper ends of the folding tools 17 are moved inwardly, as illustrated in Figs. 10 and 11. During this inward movement the folding rulers 17a meet with the centre of the fields of the container body to be pressed in, which are illustrated in Fig. 1 by WXYZ. The folding closure prepared by creasing or in a similar manner is brought to a semi-closed state by the action of the folding noses 17a, whereby—as may be seen from Figs. 10 and 11—the cross bars 17b act against the container edges, thereby guaranteeing that the edges mentioned form a rectangle. It is, therefore, prevented that the folding closure is irregular or for instance deformed.

After the tool 17 has folded the folding closure partly, the carrier 13, during the further rotation of the disc 12, immerses into the liquid for impregnation, for instance into a bath of melted paraffine. Whilst the carrier 13 passes through the liquid for impregnating, its axis is directed horizontally, because in a horizontal position of the container to be impregnated the entering of the impregnating liquid into the container as well as the flowing out of the liquid later on takes place quickly and easily without impairing the shape of the paper container in any way by remaining air bubbles or effect of buoyancy or by means of impregnating liquid taken out of the impregnating bath.

As soon as the carrier has arrived in its uppermost position in which it arrives in the line A—B of Fig. 6, the impregnated container is ejected, which is especially illustrated in Figs. 12 and 13. Parallel to the axis 11 of the disc 12 carrying the carriers for the containers to be impregnated runs a strand of a chain 23, on which an operating boss 24 and an ejector 25 are arranged behind each other. By the operating boss 24 an angle lever 26 is laid round, the other end of which acts against the roll 21 and presses the connecting pieces 19 again into the position illustrated by Fig. 8. By this also the folding rulers 17a are again opened, so that the ejector 25 following the operating boss 24 can eject the impregnated paper container from the carrier 13 without the folding tool interfering in any way with the removal of the paper container. During ejection, the paper container is sufficiently supported by the two arms 16.

The paper container ejected in this way arrives over a slope 27 on to a thin block 28 kept in position and which is arranged on a rotating conveying means, for instance on a rotating conveying chain 29. The block 28 is so thin and so long that the paper container is threaded on it without impairing the partly closed state of the folding closure and supports itself with its bottom on the upper end of this block 28 without its partly folded container mouth touching the parts carrying the block 28. The paper container is, with its mouth facing downwards, guided along a certain way G—H of the conveyor chain 29 through a heated chamber in order that the superfluous means for impregnating, for instance paraffine, can flow out of the paper container and drain off. The conveyor chain 29 then runs round the disc 30. The paper containers then arrive on a track 31, the essential part of which is arranged horizontally. On this track the paper containers are pushed forward by the block 28. The part J—K of this track is still in the heated chamber, so that the impregnating medium collects at the transition between bottom and container body and closes there any existing leakiness. The remaining part L—M of the horizontal way mentioned passes through a cooled chamber 32. The cooling can for instance be effected in such a way that cooled air is blown in through the pipe line 33. By passing the impregnated paper containers through the cooling chamber a quick congealing of the impregnating coating as well as a nice appearance of the containers is achieved. The paper containers are also taken along by the block 28 whilst the conveying means is running round a wheel 34. During the way N—O the paper containers are carried in the original manner by the upper strand of the conveying means 29, that is to say, during this way the bottom of each paper container supports itself on the correspondingly arranged block 28. By the fact that the lower as well as the upper strand of the means for conveying 29 are employed for passing through the cooling chamber 32, space is saved. The cooling chamber, therefore, is of compact design, which is advantageous for the reason that in this way it allows the undesired entering of heat into the cooling chamber to a very small degree only. By the upper strand of the conveying means the paper containers are finally carried up to position P, where the paper containers may be taken off the block 28 in any manner and forwarded to their further employment, for instance to a filler.

In order to employ the impregnating device for impregnating paper containers of different sizes, especially of different heights, the carriers for the reception of the paper containers can be provided with an operated stop limiting their possibility of penetrating the paper containers, which is illustrated in Figs. 14–17. Each carrier 13 is provided with an oscillating stop 41. This stop 41 is fixed on an oscillatingly supported bolt 42, which carries a further arm 43, on which a roll 44 is arranged. On the track through which this roll 44 runs during the rotation of the carriers 13 a grooved curve 45 is arranged with a widened inlet 45a. This curve is carried by a slide 46 which can be moved in the guides 47 by the rods 48, 49, and 50 fixed to it.

If the stop 41 is completely turned down, as illustrated in Fig. 14, the paper containers can be fed in up to the lower cross bar of the carrier 13. In case however shorter paper containers have to be impregnated, these shorter paper containers are not allowed to be fed into the carrier 13 just as deep, since then the folding closure would be no more in the vicinity of the folding noses 17a. When impregnating the shorter paper containers the stop 41 is brought into the position illustrated in Figs. 15 and 16, in which the stop 41 is turned down inwardly and is a support for the bottom of the paper container.

It is, however, not necessary for the attendant to adjust each individual stop 41 according to the size of the paper container to be dealt with. It is sufficient to operate the rods 48, 49 by a suitable device and hereby adjust the slide 46 and also the curve 45. Through the widened inlet 45a all rolls 44 are guided into the grooved curve 45 during one rotation of the disc 12, so that by the action of the curve 45 during one rotation of the disc 12 each stop 41 is brought into the required position. The illustrated device is arranged for two container sizes only, therefore two positions of the stop 41 suffice. In both these positions the stop 41 is kept by the spring 51. It, therefore, suffices that the curve 45 extends only along a part of the way passed by the rolls 44. It is, however, also possible to develop the device in such a way that any number of adjustments of the stop 41 can be performed. In this instance it is advisable to arrange the operating curve along the whole way of the rolls 44.

The mode of performance according to the invention has been described above for paper containers with round bottom and rectangular, bellows-like folding closure. The method under invention is, however, not limited to these containers. It can just as well be applied to differently shaped paper containers with folding closure. It is obvious that the device illustrated in Figs. 5 and 17 can be employed without any objections in the same way for paper containers having rectangular cross section all over. If paper containers are dealt with, the closing part of which is provided with a greater number of concertina-like folds, it is advisable to employ the same number of folding noses 17a as folding lines are to be performed.

From the foregoing it is obvious that the invention is not to be restricted to the exact embodiment shown in the drawings but is broad enough to cover all structures coming within the scope of the annexed claims.

We claim:

1. A process of manufacturing paraffined or in a similar manner impregnated paper containers of the type having a folding closure, said process comprising the passing of the paper containers with partly closed folding closure through the liquid for impregnating and the subsequent turning of the paper containers with their mouths facing downwards for draining off, whereby the paper containers are held at their bottom end in order that the state of the folding closure is not impaired.

2. A process according to claim 1, comprising a step in which the paper containers with a folding closure kept in a semi-closed state are horizontally fed into the liquid for impregnation and/or withdrawn again.

3. Device for impregnating paper containers of the type having a folding closure, said device comprising carriers for the reception of the paper containers during the impregnating process being provided with tools for partly folding the folding closure of the paper containers.

4. Device according to claim 3, the carrier for the reception of a paper container being provided with a stop operated by an adjustable curve and limiting the entering into the paper container.

5. Device for impregnating paper containers of the type having a bellows-like folding closure, said device having folding tools arranged on the carriers for the paper containers to be impregnated, said folding tools being provided with projecting folding rulers for entering the angles of the folding closure to be pressed in and with cross bars lying behind these projecting folding rulers and acting against the edges of the paper container, thereby avoiding a deforming of the container mouths.

6. Device for impregnating paper containers of the type having a folding closure, said device being provided with carriers for the paper containers holding the mouth of the container in a partly closed state during the impregnating process, said carriers for the paper containers being arranged oscillatingly on the conveying means leading through the liquid for impregnation and being operated in such a way that the axis of each individual carrier is, whilst receiving a paper container, directed in an angle to the level of the impregnating liquid and, whilst immersing into the liquid, is directed parallel to the level of the liquid.

7. Device according to claim 6, the carriers for the paper containers being held, during the immersion into the liquid for impregnating and during the withdrawal, transverse to the direction of their forward movement.

8. Device for impregnating paper containers of the type having a folding closure, said device including means for conveying the paper containers in semi-closed state through the liquid for impregnation, and a second conveying means provided with mandrels directed vertically to the movement of conveying and over which the paper containers are turned without any alteration of the semi-closed state of the folding closure.

9. Device for impregnating paper containers of the type having a folding closure, said device including means for conveying the paper containers in semi-closed state through the liquid for impregnation, and a second conveying means receiving the impregnated paper containers, said second conveying means being guided in such a way that the paper containers first are carried with their mouths facing downwards through a heated chamber along the upper strand of the conveying means and are then led in an upright position through a likewise heated chamber along the lower strand and finally pass a way defined by the remaining part of the lower strand and a part of the upper strand and leading through a cooled room.

GÜNTHER MEYER-JAGENBERG.
KARL KÜCHLER.